United States Patent [19]
>
> Pasquali et al.

[11] Patent Number: 4,917,404
[45] Date of Patent: Apr. 17, 1990

[54] DEVICE FOR SUPPORTING THE FUEL CHARGING FILLER FOR MOTOR VEHICLES

[75] Inventors: Renato Pasquali, Garbagnate Milanese; Luigi Verga, Vertemate con Minoprio, both of Italy

[73] Assignee: Alfa Lancia Industriale S.p.A., Arese, Italy

[21] Appl. No.: 133,878

[22] Filed: Dec. 16, 1987

[30] Foreign Application Priority Data

Dec. 30, 1986 [IT] Italy .................................. 24264B/86

[51] Int. Cl.$^4$ ............................................. B60R 25/00
[52] U.S. Cl. ...................................... 280/853; 16/257;
16/386; 70/159; 403/14
[58] Field of Search ............. 280/152 A, 853; 70/159, 70/241, 257; 292/144; 16/229, 257, 386; 403/13, 14

[56] References Cited

U.S. PATENT DOCUMENTS

| 2,035,895 | 3/1936 | Kelly | 70/159 |
| 2,081,717 | 5/1937 | Steele | 70/159 |
| 2,259,970 | 10/1941 | Benzick | 280/152 A |
| 3,759,075 | 9/1973 | Lipschutz | 70/159 |

FOREIGN PATENT DOCUMENTS

| 180320 | 10/1983 | Japan | 280/152 A |
| 139518 | 6/1986 | Japan | 280/152 A |
| 163019 | 7/1986 | Japan | 280/152 A |
| 285123 | 12/1986 | Japan | 280/152 A |

Primary Examiner—Charles A. Marmor
Assistant Examiner—Michael Mar
Attorney, Agent, or Firm—Charles E. Brown; Charles A. Brown

[57] ABSTRACT

The device comprises an integrated unit formed by a container element having an opening for the filler, a door hinged onto the container element and subject to the action of an opening spring and an electrically actuatable lock for the door. The container element with the door and the lock mounted thereon are fastened as a single unit to the metal sheet of the bodywork.

2 Claims, 3 Drawing Sheets

DEVICE FOR SUPPORTING THE FUEL CHARGING FILLER FOR MOTOR VEHICLES

The present invention relates to a support device for the fuel charging filler for motor vehicles.

BACKGROUND OF THE INVENTION

It is known that the motor vehicles are generally equipped with a device for fuel charging, located on the outer skin of the rear side portion of the bodywork, and formed by a metal part, or a rubber part, which defines a housing for the fuel filler and for the relating sealing cap, and is welded, or otherways fastened, to the metal sheet of the bodywork in correspondence of an opening provided on the same bodywork. Due to aesthetical and aerodynamic reasons, the filler sealing caps are covered, or masked, with a door, which, in most cases, is directly hinged to an edge provided on the metal sheet of the same bodywork.

It is clear that during the steps of assemblage of the filler, and of the relevant covering door, a number of interventions are necessary, which must be carried out directly on the same bodywork. It is known as well that such type of interventions, by the assembler, are rather critical, due to reasons of available room.

The purpose of the present invention is to propose a device for supporting the fuel charging filler. The assemblage of the filler on the bodywork of a motor vehicle is extremely simplified.

SUMMARY OF THE INVENTION

In order to achieve this purpose, according to the invention a device is proposed, for supporting the fuel charging filler for motor vehicles. The devices comprises a filler support part, defining a housing for the filler, and is shaped to be fastened to the sheet metal of the bodywork of the motor vehicle, in correspondence with an opening provided on the bodywork. The device is constituted by an integrated unit, comprising a container element having an opening for housing the filler, a door hinged onto the container element, and biased by the action of elastic opening means. Electrically actuatable locking means is provided for the door. The container element with the door, and the locking means mounted on it are suitable for being fastened to the sheet metal of the bodywork.

Advantageously, the container can be made as one single piece only, e.g., of plastics material, substantially formed by a cup-shaped body, with an opening for housing the filler. The container also has opposite seats being provided, which are constituted by cylindrical hollows suitable for supporting the pivots linking the door to the container.

A preferred hinging system, for hinging the door to the container, is accomplished by means of two pivots, having a cylindrical spring disposed therebetween. The pivots and the spring are housed coaxially inside a cylindrical through bore provided on the door. The pivots are supported inside seats provided on the container. The seats are provided each with an invitation slot for the assemblage of the pivots.

The container can be also equipped with a bracket, integrally realized as one single piece with the cup-shaped body, to make it possible the electrical actuator for the above said door-locking means to be fastened.

The advantages and characteristics of the present invention are now illustrated by referring to the hereto attached FIGS. 1, 2 and 3, wherein, as a non-limitative example, a preferred practical embodiment of the same invention is shown.

DESCRIPTION OF THE PREFERRED EMBODIMENT

Figure 1:
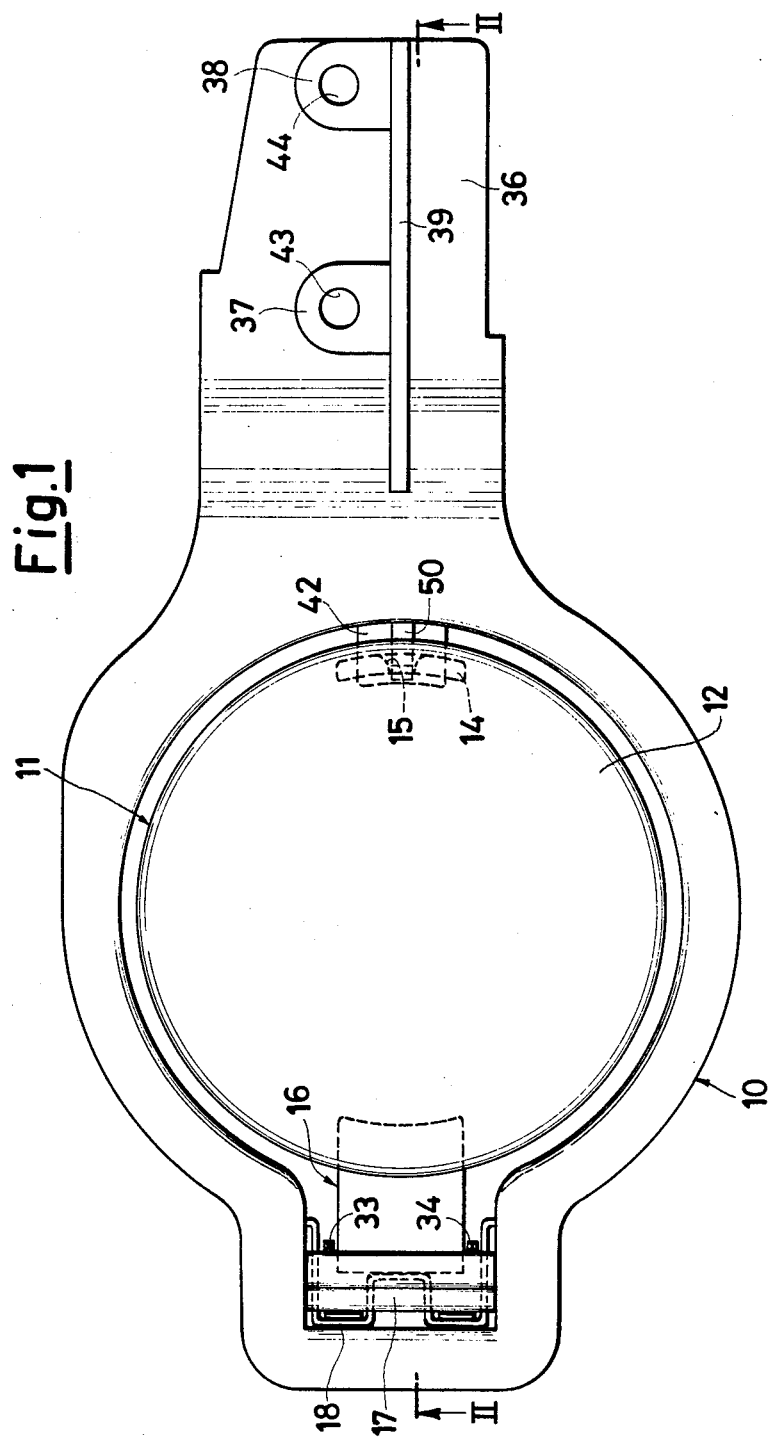
FIG. 1 shows a plan view of a support device according to the present invention, wherein the hinging of the door to the container body is also visible.
Figure 2:
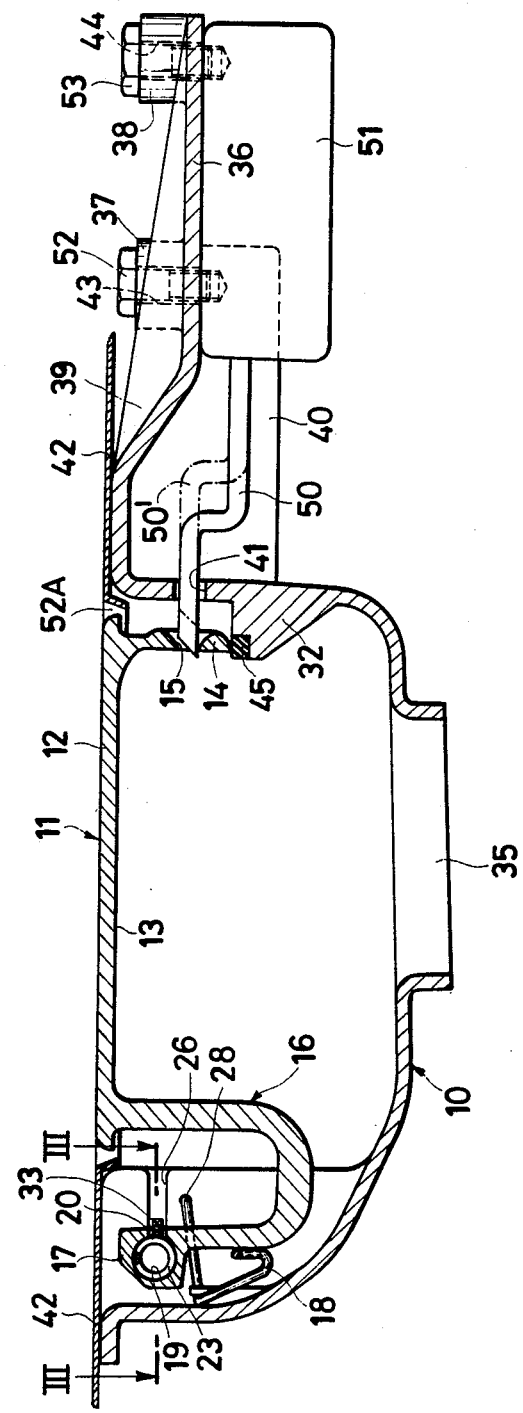
FIG. 2 shows a sectional view according to path II—II of FIG. 1.
Figure 3:
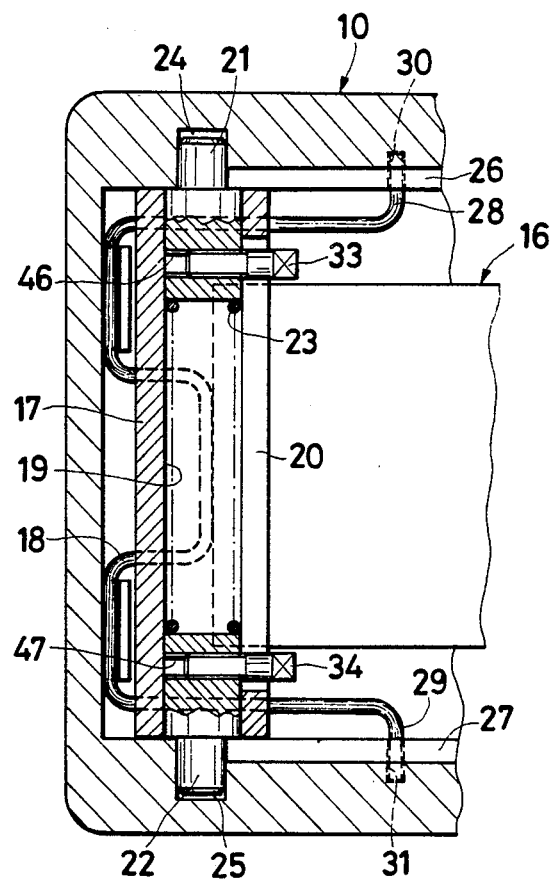
FIG. 3 shows an enlarged sectional view according to path III—III of FIG. 2.

In FIGS. 1, 2 and 3, by the reference numeral 10 the container for the filler (with the relevant cap), not shown in the figures, is generally indicated, and by the reference numeral 11 generally indicated is the sealing door. The sealing door 11 is constituted by a plate 12 of a substantially circular shape, provided, on the side of its internal surface 13, with a protruding edge 14. A countersunk bore 15 is provided, which is suitable for receiving a locking latch 50 of an electrical actuator 51.

In a position diametrically opposite to the edge 14, the door 11 is provided with an "U"-shaped arm 16, which forms one single piece with the plate 12. A free end 17 is provided with a through bore 19, extending parallelly to the curvature of the "U". By the numeral 20, indicated is a hollow, provided on the end 17, parallelly to the through bore 19. The numerals 21 and 22 indicate two pivots, each having a bore 46 and, respectively, 47, which are suitable for receiving a respective peg 33, 34, inserted through the hollow 20. A spring 23, located between the pivots 21 and 22 inside the through bore 19, axially urges the pivots 21 and 22 into opposite cylindrical seats 24 and 25 of the container 10. They are suitable for rotatably receiving the pivots 21 and 22. By the reference numerals 26 and 27, invitation guides are indicated, which perform the task of facilitating the assemblage of pivots 21 and 22 into their respective cylindrical seats 24 and 25. A cylindrical spring 18, acting in the direction of opening of the door 11, has a central portion which engages the "U"-shaped portion 16 of the door 11, and respective ends 28 and 29 retained on the container 10 inside hollows, respectively indicated by the reference numerals 30 and 31.

Inside the interior portion of the container 10, a stop bracket 32 for the door 11 is shaped, which is provided with an elastic stop 45 destined to come into engagement with the free end of the edge 14. The reference numeral 35 indicates an opening of substantially circular shape which is destined to receive the fuel charging pipe, not shown in the figures.

The container 10 is furthermore provided, at the side opposite to the side on which the door 11 is hanged, with a bracket 36. There are protrusions 37 and 38 with bores 43 and 44, for the fastening of the electrical actuator 51 by means of fastening screws 52 and 53. By the reference numerals 39 and 40, strengthening ribs for the bracket 36 are indicated, and by 41 a bore in container 10 is indicated, to allow the passage of the locking latch 50.

In FIG. 2, by 42 the metal sheet is furthermore indicated, of the bodywork, to which the filler support device is fastened. By adhesive banding the door 11 comes to be in correspondence of an opening 52A of the metal sheet 42 of the bodywork of the motor vehicle, with the container 10 being complete, equipped with the door and the electrical door actuator.

In order to open the door 11, the electrical actuator 51 is energized, the moves the latch 50 towards itself, as shown by the dashed line 50'. As soon as the door 50 has left the countersunk bore 15, the spring 18 urges the door 11 outwards. In the meantime, the actuator 51, being de-energized, makes the latch 50 return back to its initial position. To shut the door 11 again, it is enough to push it, up to overcome the force of a spring, not shown, which counteracts the rearwards motion of the latch 50.

We claim:

1. A device for supporting the fuel charging filler of a motor vehicle, comprising a filler support part defining a housing for the filler and shaped to be fastened to the sheet metal of the bodywork of the vehicle in a corresponding opening provided on the same bodywork, said device being constituted by an integrated unit comprising a container element having a first opening for receiving the filler and a second opening with a door hinged thereto, elastic means for biasing the door to an open position, and electrically actuatable locking means for securing the door in a closed position, said container element with said door and said locking means mounted thereon being suitable for being fastened to the sheet metal of the bodywork, said container element being made as a single, integral cup-shaped body with said first and said second openings formed therein, said container element having a bracket integrally formed with the cup-shaped body to permit said locking means to be attached thereto, said container element having opposed cylindrical seats each of which is suitable for receiving and supporting a respective pivot pin linking the door to said container element, a cylindrical spring located between said pivot pins and coaxial therewith for biasing said pivot pins into their respective cylindrical seats, and invitation guide means for facilitating the assemblage of said door to said container element, said invitation guide means comprising recessed passages located on opposed walls of said container element for receiving and guiding said pivot pins into said cylindrical seats.

2. A device according to claim 1, wherein said door has an essentially U-shaped arm with a free end, the free end of the arm being provided with a through bore for housing said pivot pins and said cylindrical spring.

* * * * *